(12) United States Patent
Kim (10) Patent No.: US 11,782,899 B2
(45) Date of Patent: Oct. 10, 2023

(54) SYSTEM AND METHOD FOR ELECTRONIC DOCUMENT ISSUING USING BLOCKCHAIN AND COMPUTER PROGRAM FOR THE SAME

(71) Applicants: Gractor Co., Ltd., Seoul (KR); Korea Energy Convergence Association, Seoul (KR)

(72) Inventor: Young Shin Kim, Seoul (KR)

(73) Assignees: Gractor Co., Ltd., Seoul (KR); Korea Energy Convergence Association, Seoul (KR)

( * ) Notice: Subject to any disclaimer, the term of this patent is extended or adjusted under 35 U.S.C. 154(b) by 383 days.

(21) Appl. No.: 17/107,473

(22) Filed: Nov. 30, 2020

(65) Prior Publication Data

US 2022/0164333 A1 May 26, 2022

(30) Foreign Application Priority Data

Nov. 20, 2020 (KR) .......................... 10-2020-0157031

(51) Int. Cl.
| | |
|---|---|
| *G05B 9/00* | (2006.01) |
| *G06F 16/23* | (2019.01) |
| *G05B 9/02* | (2006.01) |
| *H04L 9/30* | (2006.01) |
| *H04L 9/00* | (2022.01) |

(52) U.S. Cl.
CPC ........... *G06F 16/2315* (2019.01); *G05B 9/02* (2013.01); *H04L 9/30* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2019/0125361 A1* | 5/2019 | Shelton, IV | ........... A61B 90/30 |
| 2019/0339687 A1* | 11/2019 | Celia | ...................... G06N 3/045 |
| 2020/0251213 A1* | 8/2020 | Tran | ........................ G16H 20/30 |

FOREIGN PATENT DOCUMENTS

KR 10-1747960 6/2017

* cited by examiner

*Primary Examiner* — Tuankhanh D Phan
(74) *Attorney, Agent, or Firm* — Fish & Richardson P.C.

(57) ABSTRACT

The system for issuing electronic documents using a blockchain according to the present invention comprises: a transceiver receiving identification information of a facility and status information of the facility from a complex sensor device for sensing the status of the facility and transmitting sensing the status of facilities and transmitting the status information of the facility to the outside; a diagnosis unit performing safety diagnosis on the facility and calculating a safety diagnosis grade according to the safety diagnosis result; a transmitter retrieving the safety diagnosis result from the distributed ledger of the blockchain network at the request of a user device and transmitting the safety diagnosis result in the form of an electronic document; and a data processer for converting the received status information of the facility and the safety diagnosis result by the diagnosis unit into a standardized data format suitable for storage in a blockchain network.

11 Claims, 4 Drawing Sheets

FIG. 4

SYSTEM AND METHOD FOR ELECTRONIC DOCUMENT ISSUING USING BLOCKCHAIN AND COMPUTER PROGRAM FOR THE SAME

CROSS-REFERENCE TO RELATED APPLICATIONS

This application claims the benefit of Korea Patent Application No. 10-2020-0157031, filed on Nov. 20, 2020, which is incorporated herein by reference for all purposes as fully set forth herein.

TECHNICAL FIELD

The present invention relates to a system and method for issuing electronic documents using a blockchain and a computer program therefor. More specifically, the present invention relates to a system and method for issuing electronic documents using a blockchain and a computer program therefor that performs a safety diagnosis on a facility, forms a block of information about it, installs the block on the blockchain, and issues electronic documents for the safety diagnosis results.

BACKGROUND ART

Facilities are required to periodically perform safety diagnoses according to their years of use. Due to the aging of facilities, the number of facilities at high risk for accidents is increasing rapidly every year, and it is difficult to manage the aging facilities exclusively by means of personnel for safety diagnosis. Further, there is a limitation in that such safety diagnosis is highly likely to involve subjective evaluation by a safety diagnosis expert, and a safety diagnosis is performed only at the time of evaluation.

In order to address these issues, a solution has been developed in which sensors are located at the facility so as to monitor the condition of the facility. However, such a solution has the limitation that people need to solve the problem only after the event.

PRIOR ART DOCUMENT

Patent Document (Patent Document 0001) Korean Patent Registration No. 10-1747960

DISCLOSURE

Technical Problem

Therefore, the present invention aims to provide a system and method for issuing electronic documents using blockchain and a computer program therefor by forming a block of the status information sensed in the facility and the safety diagnosis result thereof and installing it on the blockchain so that it can be shared and accessed, thereby accurately diagnosing the safety of the facility and issuing the safety diagnosis result in the form of an electronic document that cannot be arbitrarily manipulated.

Further, the present invention aims to provide a system and method for electronic documents issuing using blockchain and a computer program therefor, capable of providing information on the status of a facility at the time of diagnosis, which forms the basis for calculating the safety diagnosis grade, along with the safety diagnosis result in an electronic document indicating the safety grade.

Technical Solution

The object is achieved by the system for issuing electronic documents using blockchain, the system comprising a transceiver receiving identification information of a facility and status information of the facility from a complex sensor device for sensing the status of the facility and transmitting the status information of the facility to the outside, a diagnosis unit performing safety diagnosis on the facility and calculating a safety diagnosis grade according to the safety diagnosis result, a transmitter retrieving the safety diagnosis result from the distributed ledger of the blockchain network at the request of a user device and transmitting the safety diagnosis result in the form of an electronic document, and a data processer converting the received status information of the facility and the safety diagnosis result by the diagnosis unit into a standardized data format suitable for storage in a blockchain network.

The status information of the facility may include information on the temperature, the humidity, the slope, the frequency, and the crack status, sensed at the facility.

The diagnosis unit may diagnose the facility based on public data received from an external server.

The safety diagnosis result is preferably provided in the form of a certificate including the time of the safety diagnosis, the safety diagnosis grade, and information serving as the basis for calculating the safety diagnosis grade.

The information serving as the basis for calculating the safety diagnosis grade may include link information for verifying about the status information of the facility.

The complex sensor device may include: a basic sensor unit including a tilt sensor, a vibration sensor, an acceleration sensor, a temperature sensor, and a humidity sensor; an extended sensor unit capable of mounting other sensors other than the basic sensor unit; a first communication unit transmitting the sensed information of the facility to the information providing server; and a battery supplying power to the basic sensor unit, the extended sensor unit and the first communication unit.

Meanwhile, the object is achieved by the method for issuing electronic documents using a blockchain, the method comprising the steps of: receiving, by the system for issuing electronic documents, status information of the facility from a complex sensor device installed in the facility; performing, by a diagnosis unit of the system for issuing electronic documents, a safety diagnosis on the facility and calculating a safety diagnosis result for the facility; converting, by a data processer of the system for issuing electronic documents, the received status information and safety diagnosis result of the facility into a standardized data format suitable for storage in a blockchain network; uploading, by the data processer, the status information and the safety diagnosis result of the facility to the blockchain network; and retrieving, by a transmitter of the safety diagnosis system, the safety diagnosis result from the distributed ledger of the blockchain network at the request of a user device and transmitting the safety diagnosis result in the form of an electronic document.

The status information of the facility may include information on the temperature, the humidity, the slope, the frequency, and the crack status, sensed at the facility.

In the step of calculating the safety diagnosis result, the safety diagnosis may be performed on the status of the facility based on public data received from an external server, thereby calculating the safety diagnosis result.

The safety diagnosis result is preferably provided in the form of a certificate including the time of the safety diagnosis, the safety diagnosis grade, and information serving as the basis for calculating the safety diagnosis grade.

The information serving as the basis for calculating the safety diagnosis grade may include link information for verifying the status information of the facility.

Effect of the Invention

The system and method for electronic document issuing using blockchain and a computer program for the same according to the present invention may form a block of the status information sensed in the facility and install it on the blockchain so that it can be shared and accessed, thereby accurately diagnosing the safety of the facility and issuing the safety diagnosis result in the form of an electronic document that cannot be arbitrarily manipulated.

Further, the system and method for electronic document issuing using blockchain and a computer program for the same according to the present invention may provide the status information of the facility at the time of diagnosis, which is the basis for calculating the safety diagnosis grade, together with the safety diagnosis result.

BEST MODE

Hereinafter, the system and method for issuing electronic documents using a blockchain according to embodiments of the present invention and a computer program therefor will be described in detail with reference to the accompanying drawings.

Figure 1:
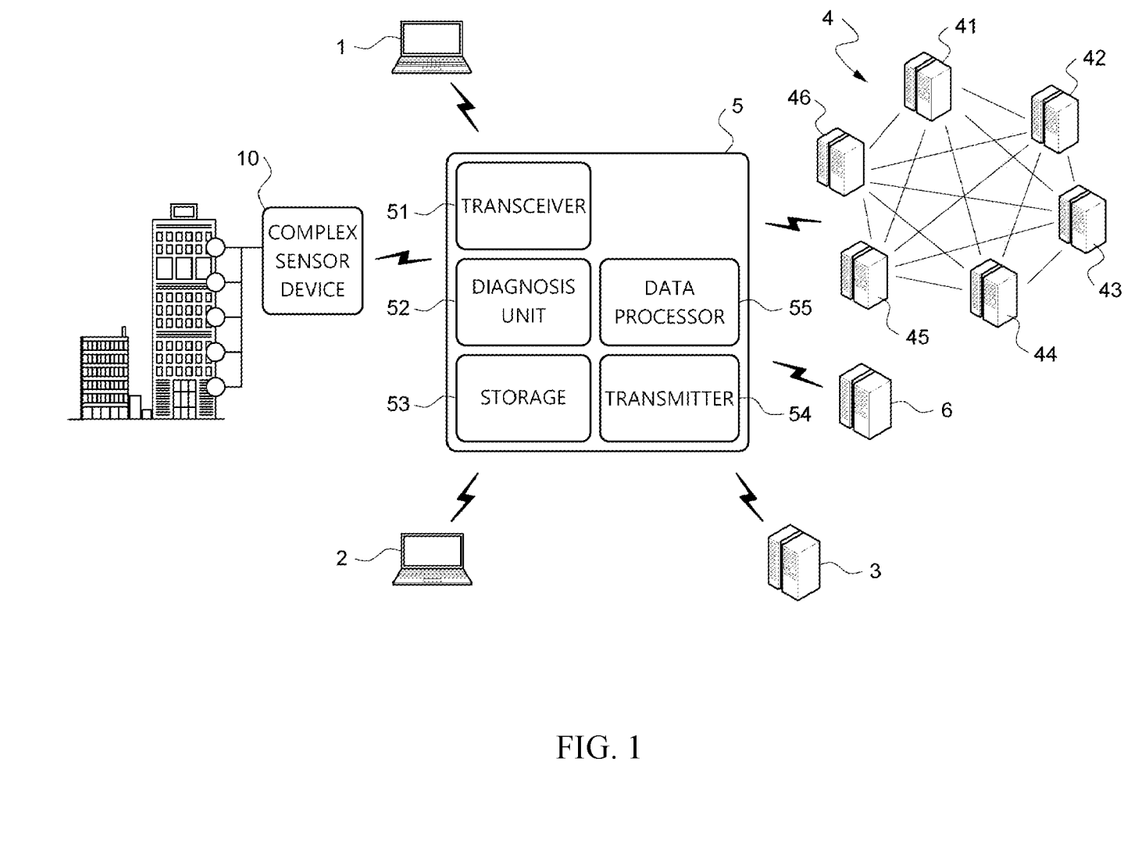
FIG. 1 is a block diagram showing the configuration of a system of issuing electronic documents according to an embodiment of the present invention.

FIG. 1 is a block diagram showing the configuration of a system of issuing electronic documents according to an embodiment of the present invention.

The system and method for issuing electronic documents using a blockchain is explained on the basis of an example which diagnoses the condition of the facility, such as temperature and/or humidity, and the slope, frequency, and crack state detected in the facility and is applied to a certificate indicating the safety diagnosis grade therefor. The system and method for issuing electronic documents using a blockchain according to the embodiments can be widely applied to fields such as a reconstruction safety diagnosis to determine whether reconstruction is possible by examining the safety of a structure according to the degree of deterioration and defect, a preliminary evaluation for safety diagnosis, and the safety diagnosis of facilities that requires safety inspection according to the Special Act on Safety Control of Installation. The system and method may issue a certificate indicating the safety diagnosis grade as a result of the diagnosis in the form of an electronic document, and provide information related to the condition of the facility at the time of diagnosis, which formed the basis for the safety diagnosis grade assigned to the certificate indicating the safety grade, together with insurance of the certificate.

As shown in FIG. 1, the system for issuing electronic documents 5 according to an embodiment of the present invention receives status information of a facility from the complex sensor device 10. Here, the facilities may include not only buildings but also various facilities requiring accident prediction, such as overpasses, bridges, tunnels, and retaining walls.

Further, the system for issuing electronic documents 5 according to an embodiment of the present invention is configured to operate by communicating with a user device 1 of a first user who is a management subject of the facility, a user device 2 of a second user corresponding to a safety diagnosis institution, and/or a user device 3 of one or more third users who have the authority to check the status information of the facility or issue or view a certificate for safety diagnosis. Further, the system for issuing electronic documents 5 communicates and operates with the blockchain network 4 maintained by using a plurality of nodes 41 to 46. Furthermore, in an embodiment, the system for issuing electronic documents 5 may operate by communicating with one or more external servers 6 such as a data portal server capable of receiving public data.

The above-mentioned communication process is performed through a wired and/or wireless network. The communication method through a wired and/or wireless network may include any communication methods in which objects can network, and is not limited to wired communication, wireless communication, 3G, 4G, or other methods. For example, wired and/or wireless networks refer to a communication network by one or more communication methods selected from the group consisting of LAN (Local Area Network), MAN (Metropolitan Area Network), GSM (Global System for Mobile Network), EDGE (Enhanced Data GSM Environment), HSDPA (High Speed Downlink Packet Access), W-CDMA (Wideband Code Division Multiple Access), CDMA (Code Division Multiple Access), TDMA (Time Division Multiple Access), Bluetooth, Zigbee, Wi-Fi, VoIP (Voice over Internet Protocol), LTE Advanced, IEEE802.16m, WirelessMAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), Wi-MAX (World Interoperability for Microwave Access), and ultrasonic communication, but it is not limited thereto.

The system, user device and server according to the embodiments may have an aspect that is wholly hardware, or partly hardware and partly software. For example, the user devices 1 to 3, the system for issuing electronic documents 5 and the external server 6, and each unit included therein, can collectively refer to hardware and related software, which process data of a specific format and content or/and transceive data by means of electronic communication. In this specification, terms such as "unit", "module", "device", "terminal", "server", or "system" are intended to refer to a combination of hardware and software driven by the hardware. For example, the hardware may be a CPU or a data processing device including other processor. In addition, software driven by hardware may refer to an executing process, an object, an executable file, a thread of execution, a program, and the like.

Figure 2:
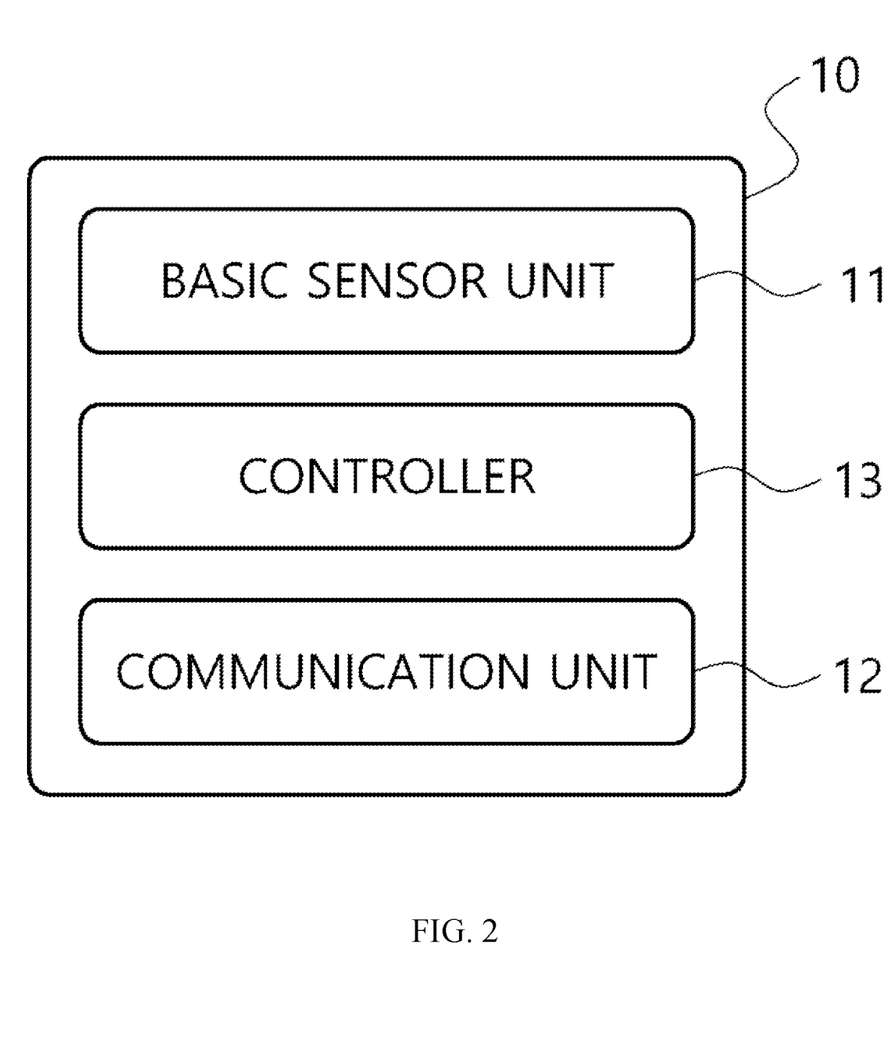
FIG. 2 is a block diagram showing the configuration of a complex sensor device according to an embodiment of the present invention.

FIG. 2 is a block diagram showing the configuration of a complex sensor device according to an embodiment of the present invention. As shown in FIG. 2, the complex sensor device 10 according to an embodiment of the present invention includes a basic sensor unit 11, a first communication unit 12, and a controller 13.

The basic sensor unit 11 may include a tilt sensor, a vibration sensor, a temperature sensor, and a humidity sensor.

The tilt sensor measures the inclination of a facility by using a gyroscope method, by physically opening and closing an electrical signal using gravity, or by using a measurement axis.

The vibration sensor may measure the vibration of the facility by measuring the amplitude of the acceleration by means of measuring the 3-axis acceleration and the 3-axis geomagnetism.

The temperature sensor and the humidity sensor measure the temperature and humidity of a facility or of a specific location within the facility.

The first communication unit 12 transmits the status information of the facility sensed by the basic sensor unit 11 to the information providing server 20. The first communication unit 12 according to the present invention may support multi-protocol for communication. For example, the complex sensor device 10 is configured to communicate with the information providing server 20 using communication methods of HTTP (HyperText Transfer Protocol), Web Socket (Web Socket), MQTT (Message Queuing Telemetry Transport), XMPP (Extensible Messaging and Presence Protocol), BLE (Bluetooth Low Energy) or LoRa WAN and LTE.

The first controller 13 collects and processes the status information of the facility sensed by the basic sensor unit 11, implements a wake-up/sleep function, and controls the first communication unit 12 to transmit the status information of the facility to the information providing server 20 in real time or at a predetermined time interval.

Figure 3:
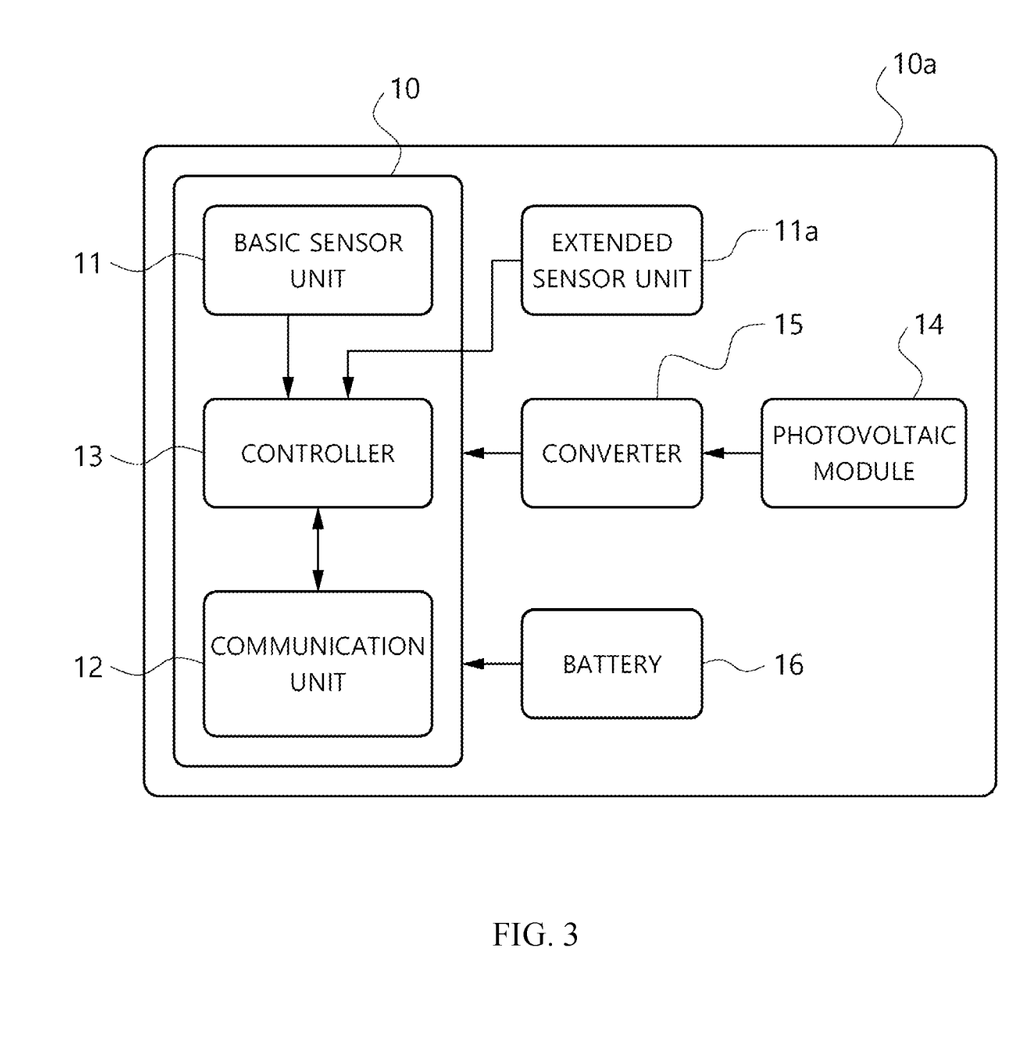
FIG. 3 is a block diagram showing the configuration of a complex sensor device according to another embodiment of the present invention.

FIG. 3 is a block diagram showing the configuration of a complex sensor device according to another embodiment of the present invention. As shown in FIG. 3, the complex sensor device according to another embodiment of the present invention may further include an extended sensor unit 11a and a battery 16.

The extended sensor unit 11a is capable of attaching and detaching sensors other than the sensors included in the basic sensor unit 11, and the sensor mounted on the extended sensor unit 11a may include a crack sensor that detects a crack condition of the facility. The crack sensor can detect a crack condition by taking an image of a specific location of a facility and then measuring the separation distance in an enlargement of the captured image.

The battery 16 supplies power to the basic sensor unit 11, the extended sensor unit 11a, and the first communication unit 12. Meanwhile, the complex sensor device 10 according to the present invention is provided with a photovoltaic module 14 which is additionally coupled to the battery unit 16 to allow charging, and a converter 15 may be provided to supply power to each component of the complex sensor device 10.

In one embodiment of the present invention, the system for issuing electronic documents 5 includes a transceiver 51, a diagnosis unit 52, storage 53, a transmitter 54, and a data processer 55. Each element constituting the system for issuing electronic documents 5 according to the present embodiment is not necessarily intended to refer to separate devices that are physically separated from each other. In other words, the hardware constituting the system for issuing electronic documents 5 is merely functionally classified into the transceiver 51, the diagnosis unit 52, the storage 53, the transmitter 54, and the data processer 55 of FIG. 1 according to operations performed by the corresponding hardware, but each unit is not necessarily provided independently of the others. Of course, depending on the embodiment, at least one of the transceiver 51, the diagnosis unit 52, the storage 53, the transmitter 54, and the data processer 55 is implemented as a separate device physically separated from each other.

A user who wants to check the condition of a facility or obtain a certificate in the form of an electronic document for the safety diagnosis result of the facility, may communicate with the system for issuing electronic documents 5 using the user devices 1 to 3, thereby receiving the safety diagnosis result of the facility. The status information or safety diagnosis grade information of the facility provided by the system for issuing electronic documents 5 may be a result obtained by verifying of the blockchain network 4 and/or an external server 6 using the link information to the system for issuing electronic documents 5 or a result stored in the system for issuing electronic documents 5.

Here, the safety diagnosis grade may be classified from A grade to E grade according to the type of facility, and the safety diagnosis period may vary according to each grade.

The transceiver 51 serves to receive at least one inquiry request among the status information and the safety diagnosis result of the facility from the first user device 1 and provide the requested status information and the safety diagnosis result of the facility to the first user device 1 after the inquiry request is approved.

Here, the first user device 1 is a device of a user who wants to inquire about the status information and safety diagnosis results of the facility through the system for issuing electronic documents 5, and may be, for example, a device used by the management subject of the facility. In FIG. 1, the first user device 1 is illustrated in the form of a laptop computer, but this is illustrative and does not limit the form of the first user device 1, and the first user device 1 may also be implemented in the form of any computing device, such as a mobile communication terminal such as a smartphone, a personal computer, a personal digital assistant (PDA), a tablet, a set-top box for Internet Protocol Television (IPTV), etc.

The external server 6 provides public data on the weather, precipitation, typhoon or heavy rain, earthquake, wind direction, wind speed, floating population, and moving vehicles at the location where the facility is installed to the system for issuing electronic documents 5 according to the present invention. The external server 30 may provide such public data to the system for issuing electronic documents 5 in various forms such as a data set and an API.

The external server 6 is not limited to providing a specific service type or device type. Although shown as one device in the drawings for convenience of description, the external server 6 may collectively refer to a plurality of different organizations.

The blockchain network 4 consists of a plurality of nodes 41 to 46 participating therein. Blockchain refers to a method of jointly managing information to maintain security by connecting information with blocks and storing information in each node 41 to 46 instead of the central management server in a peer-to-peer (P2P) network distributed environment. The basic structure of information shared on the blockchain is in the form of a collection of blocks that are connected one after another. Over a certain period of time, more than half of the participants exchange transaction details with each other to verify and approve them, and then only the financial transaction details agreed by digital signature are made into one block. Then, the newly created block is connected to the previous blockchain, and its created copy is distributed and stored in each node 41 to 46.

In the embodiments of the present invention, the blockchain network 4 is implemented with the nodes 41 to 46 as participants, and the identification information of the facility and the status information of the facility may be saved as a data block. In this specification, a series of information recorded in one data block refers to transaction information.

In FIG. 1, each of the plurality of nodes 41 to 46 is shown in the form of a server, but each of the plurality of nodes 41 to 46 may include all kinds of computing devices that can be connected to an external server through a wireless communication network such as a mobile communication terminal such as a smartphone, a PDA, a tablet PC, a desktop PC, an IPTV set-top box, etc. Further, although FIG. 1 illustrates that the blockchain network 4 is configured by six nodes 41 to 46, it is easy to understand that the number of nodes participating in the blockchain network 4 may be more or less.

Furthermore, in the present embodiment, it has been described that the inquiry of the status information of the facility is requested by the management subject, but in other embodiments, a safety diagnosis agency or a user with authority to issue or view a certificate may also request an inquiry of status information, and in this case, the first user device 1 may be the same as the second user device 2 or third user device 3.

The transceiver 51 may receive the identification information of the facility and the status information of the facility from the complex sensor device 10 that senses the status of the facility by at least one Internet of Things-based device, and transmit the status information of the facility and/or information on the safety diagnosis grade assigned by diagnosis unit 52 in the form of an electronic document to the user devices 1 and 2.

The diagnosis unit 52 performs a diagnosis based on the received status information of the facility and calculates a safety diagnosis grade therefor. The safety diagnosis grade calculated by the diagnosis unit 52 may be calculated according to the standard prescribed by related laws.

The diagnosis unit 52 according to the present invention may perform diagnosis of the facility received from the complex sensor device 10 based on public data received from the external server 6. For example, it is possible to determine whether or not the temperature change is normal by referring to the weather at the time of sensing the status of the facility.

The storage 53 stores the status information of the facility received from the transceiver 51 and information on the safety diagnosis grade calculated by the diagnosis unit 52. Here, the status information of the facility stored in the storage 53 may be stored in various forms such as text, numbers, and images, and it is preferable that the time at which the status is sensed is stored with it to ensure objectivity.

The transmitter 54 transmits a safety diagnosis result for a facility requested for an inquiry from the user devices 1 to 3. The transmitter 54 retrieves the safety diagnosis result from the distributed ledger of the blockchain network 4 at the request of the user device or transmits the data stored in the storage 53 in the form of an electronic document. The safety diagnosis result transmitted by the transmitter 54 is preferably an electronic document file in the form of a certificate that includes link information for verifying about the status information of the facility, which is the basis for calculating the safety diagnosis grade, along with the diagnosis time and the safety diagnosis grade of the facility.

When the status information of the facility is received from the transceiver 51, the data processor 55 stores it in the storage 53, and converts the received status information of the facility and/or the safety diagnosis result obtained by the diagnosis unit 52 into a standardized data format suitable for storage in the blockchain network 4.

Further, the data processor 55 uploads the status information and safety diagnosis results of the facility to the blockchain network 4.

In order to perform a safety diagnosis of a facility, it is necessary to perform a diagnosis on the status of the facility during a specific period, so the data processor 55 according to the present invention retrieves the facility status information of the safety diagnosis object during a predetermined time interval and stores it on the storage 53. When all information for calculating the safety diagnosis grade is retrieved by the diagnosis unit 52, it is preferably used to calculate the safety diagnosis grade for the target facility.

In one embodiment, the system for issuing electronic documents 5 at least partially performs a server function enabling the function of the application by communicating with an application (or app) executing on the user devices 1 to 3. The system for issuing electronic documents 5 may also at least partially perform a function of web server that provides a predetermined web page accessible through a web browser or the like executing on the user devices 1 to 3.

The blockchain network 4 consists of a plurality of nodes 41 to 46 participating therein. Blockchain refers to a method of jointly managing information to maintain security by connecting information with blocks and storing information in each node 41 to 46 instead of the central management server in a peer-to-peer (P2P) network distributed environment. The basic structure of information shared on the blockchain is in the form of a collection of blocks that are connected one after another. Over a certain period of time, more than half of the participants exchange transaction details with each other to verify and approve, and then only the financial transaction details agreed by digital signature are made into one block. Then, the newly created block is connected to the previous blockchain, and the created copy is distributed and stored in each node 41 to 46.

In the embodiments of the present invention, the blockchain network 4 is implemented with nodes 41 to 46 as participants, and each of the plurality of nodes 41 to 46 may store the data file constituting the status information of the facility or file corresponding to the partial data thereof. The data file constituting the status information of the facility may be a file encrypted by public-key cryptography using a private key and a public key, but is not limited thereto. The data stored in each of the plurality of nodes 41 to 46 may be always kept up to date and shared on the blockchain network 4, and each block of information in the form of a blockchain may be stored in at least one of the plurality of nodes 41 to 46.

In FIG. 1, each of the plurality of nodes 41 to 46 is shown in the form of a server, but each of the plurality of nodes 41 to 46 may include all kinds of computing devices that can be connected to an external server through a wireless communication network such as a mobile communication terminal such as a smartphone, a PDA, a tablet PC, a desktop PC, an IPTV set-top box, etc. Further, although FIG. 1 illustrates that the blockchain network 4 is configured by six nodes 41

Figure 4:
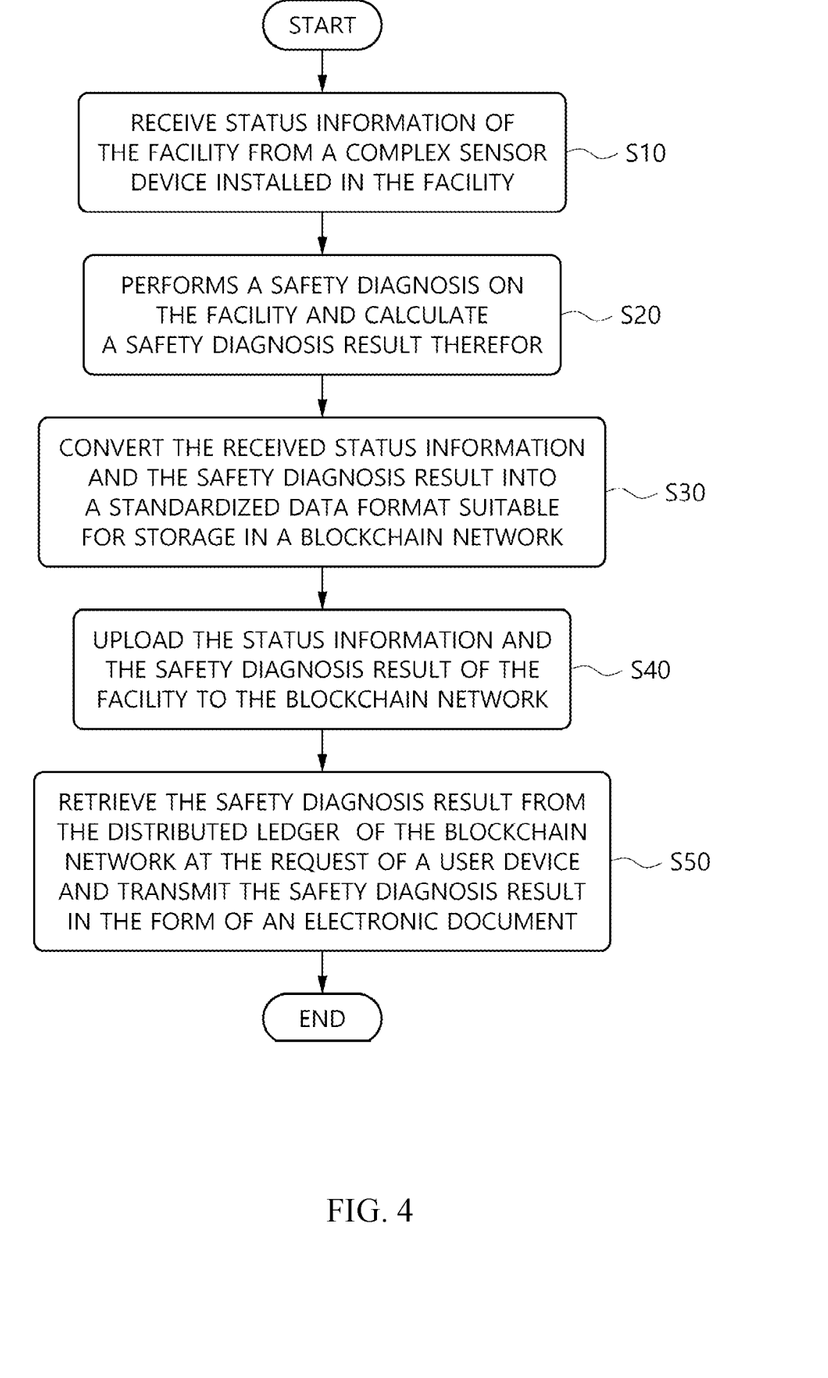
FIG. 4 is a flowchart showing a method of issuing electronic documents according to an embodiment of the present invention.

Hereinafter, a method for issuing electronic documents using a blockchain according to an embodiment of the present invention will be described with reference to FIG. 4.

First, the status information of the facility is received from a complex sensor device 10 installed in the facility (S10). Here, the status information of the facility may include information on the temperature, the humidity, the slope, the frequency, and the crack status and the like, sensed at the facility. Further, the safety diagnosis system according to the present invention may further include the step of receiving public data on weather, precipitation, typhoon or heavy rain, earthquake, floating population, moving vehicles, etc. from the external server 6 together with the status information of the facility.

Further, the diagnosis unit 52 performs a safety diagnosis on the facility and calculates a safety diagnosis result therefor (S20). Here, in step S20, the safety diagnosis grade result may be calculated by performing diagnosis on the facility based on public data received from the external server 5 together with the status information of the facility.

Next, the data processer 55 converts the received status information and safety diagnosis result of the facility into a standardized data format suitable for storage in a blockchain network by the safety diagnosis system. Conversion to a standardized data format may include parsing data and/or changing the data format.

Further, the data processer uploads the status information and the safety diagnosis result of the facility to the blockchain network 4 (S40).

The transmitter 53 retrieves the safety diagnosis result from the distributed ledger of the blockchain network at the request of a user device and transmits the safety diagnosis result in the form of an electronic document.

Here, the electronic document transmitted in step S50 may include information such as a link for verifying about information that is the basis for calculating the safety grade, along with the safety diagnosis time and the safety grade of the facility, and can be issued in the form of a file with an extension.

According to the system and method for issuing electronic documents according to the embodiments described above, the safety diagnosis result of the facility is recorded in the form of a transaction on the blockchain network 4, so that it is impossible for any user to arbitrarily manipulate the existing diagnosis results unless more than half of the nodes constituting the blockchain network 4 are hacked.

As a result, it is possible to avoid the risk that the safety diagnosis result of the facility is manipulated afterwards. Further, since the safety diagnosis result is distributed and recorded on the blockchain network 4, there is the advantage that separate costs are not required due to issuance of documents in the form of hard copies for storage and management of a vast database.

The operation of the method for issuing electronic documents according to the above-described embodiments may be implemented at least partially by a computer program and recorded on computer-readable recording media. A program consisting of instructions for implementing an operation according to the method for issuing electronic documents is recorded on the recording medium. For example, an embodiment of the present invention may be implemented in the form of an application (or app) capable of executing a malicious link detection method on a detection server or a user terminal such as a smartphone or tablet. Further, the recording medium includes any type of recording device capable of storing computer-readable data. For example, computer-readable recording media include ROM, RAM, CD-ROM, magnetic tapes, floppy disks, and optical data storage devices. Further, the computer-readable recording media may be distributed over a computer system connected through a network, and computer-readable codes may be stored and executed in a distributed manner. Functional instructions, codes, and code segments for implementing the embodiments may be easily understood by those of ordinary skill in the art to which the embodiments belong.

The above description is merely an embodiment for implementing a blockchain-based system and method for issuing electronic documents and a computer program therefor according to the present invention. The present invention is not limited to the above embodiment. Without departing from the gist of the present invention claimed in the following claims, the technical scope of the present invention is to the extent that the present invention can be variously changed and implemented by anyone of ordinary skill in the art to which the present invention belongs.

REFERENCE DESCRIPTION 1, 2, and 3: user device
4: blockchain
5: system for issuing electronic documents
6: external server
10: complex sensor device
11: basic sensor unit
11a: extended sensor unit
12: communication unit
13: controller
14: photovoltaic module
15: converter
16: battery
51: transceiver
52: diagnosis unit
53: storage
54: transmitter
55: data processer

The invention claimed is:

1. A system for issuing electronic documents using a blockchain network, the system comprising:
a transceiver receiving identification information of a facility and status information of the facility from a complex sensor device for sensing the status of the facility and transmitting the status information of the facility to the outside, wherein the status information of the facility includes information on a temperature, a humidity, a slope, a frequency, and a crack status that are sensed at the facility;
a diagnosis unit performing a safety diagnosis on the facility and calculating a safety diagnosis grade according to a result of the performed safety diagnosis;
a transmitter retrieving the result of the performed safety diagnosis from a distributed ledger of the blockchain network in response to a request of a user device and transmitting the result of the performed safety diagnosis in a form of an electronic document; and
a data processor converting the received status information of the facility and the result of the performed safety diagnosis into a standardized data format suitable for storage in the blockchain network,
wherein the received status information of the facility and the result of the performed safety diagnosis are converted into the standardized data format through data parsing and data format changing, wherein the diagnosis unit performs the safety diagnosis on the facility based on public data received from an external server and the status information of the facility, wherein the blockchain network is comprised of a plurality of nodes, and the status information of the facility and the result of the performed safety diagnosis converted into the standardized data format by the data processor are stored as a data block in each of the plurality of nodes with the identification information of the facility, and wherein the data block is stored as a file encrypted by public key cryptography using a private key and a public key.

2. The system of claim 1, wherein the result of the performed safety diagnosis is provided as a certificate including a time of the safety diagnosis, the safety diagnosis grade, and information serving as a basis for calculating the safety diagnosis grade.

3. The system of claim 2, wherein the information serving as the basis for calculating the safety diagnosis grade includes link information for inquiring the status information of the facility.

4. The system of claim 1, wherein the complex sensor device includes:
- a basic sensor unit including a tilt sensor, a vibration sensor, an acceleration sensor, a temperature sensor, and a humidity sensor;
- an extended sensor unit capable of mounting other sensors other than the basic sensor unit;
- a first communication unit transmitting sensed information of the facility to an information providing server; and
- a battery supplying power to the basic sensor unit, the extended sensor unit and the first communication unit.

5. The system of claim 1, wherein the diagnosis unit is configured to perform the safety diagnosis on the facility by comparing the public data received from the external server and the status information of the facility at a time of detecting the status information of the facility.

6. A method for issuing an electronic document using a blockchain network, the method comprising:
- receiving, by a system for issuing electronic documents, status information of a facility from a complex sensor device installed in the facility, wherein the status information of the facility includes information on a temperature, a humidity, a slope, a frequency, and a crack status that are sensed at the facility;
- performing, by a diagnosis unit of the system for issuing electronic documents, a safety diagnosis on the facility and calculating a safety diagnosis result for the facility;
- converting, by a data processor of the system for issuing electronic documents, the received status information of the facility and the safety diagnosis result for the facility into a standardized data format suitable for storage in the blockchain network;
- uploading, by the data processer, the status information of the facility and the safety diagnosis result for the facility to the blockchain network; and
- retrieving, by a transmitter of the diagnosis unit, the safety diagnosis result for the facility from a distributed ledger of the blockchain network in response to a request of a user device and transmitting the safety diagnosis result for the facility in a form of an electronic document, wherein the received status information of the facility and the safety diagnosis result for the facility are converted into the standardized data format through data parsing and data format changing, wherein the blockchain network is comprised of a plurality of nodes, and the status information of the facility and the safety diagnosis result for the facility converted into the standardized data format by the data processor are stored as a data block in each of the plurality of nodes with identification information of the facility, and wherein the data block is stored as a file encrypted by public key cryptography using a private key and a public key.

7. The method of claim 6, wherein the safety diagnosis result for the facility is provided as a certificate including a time of the safety diagnosis, a safety diagnosis grade, and information serving as a basis for calculating the safety diagnosis grade.

8. The method of claim 7, wherein the information serving as the basis for calculating the safety diagnosis grade includes link information for inquiring the status information of the facility.

9. A computer program stored in a computer-readable recording medium to execute the method for issuing an electronic document according to claim 6 in combination with hardware.

10. A computer program stored in a computer-readable recording medium to execute the method for issuing an electronic document according to claim 7 in combination with hardware.

11. A computer program stored in a computer-readable recording medium to execute the method for issuing an electronic document according to claim 8 in combination with hardware.

* * * * *